(12) United States Patent
Cöster et al.

(10) Patent No.: US 11,455,850 B2
(45) Date of Patent: Sep. 27, 2022

(54) POWER CONVERTER FOR TRANSFERRING POWER

(71) Applicant: ASSA ABLOY AB, Stockholm (SE)

(72) Inventors: Anders Cöster, Stockholm (SE); Bernt Arbegard, Järfälla (SE)

(73) Assignee: ASSA ABLOY AB, Stockholm (SE)

( * ) Notice: Subject to any disclaimer, the term of this patent is extended or adjusted under 35 U.S.C. 154(b) by 550 days.

(21) Appl. No.: 16/470,914

(22) PCT Filed: Dec. 20, 2017

(86) PCT No.: PCT/EP2017/083884
§ 371 (c)(1),
(2) Date: Jun. 18, 2019

(87) PCT Pub. No.: WO2018/115159
PCT Pub. Date: Jun. 28, 2018

(65) Prior Publication Data
US 2020/0090438 A1    Mar. 19, 2020

(30) Foreign Application Priority Data

Dec. 21, 2016 (EP) .................................. 16205857

(51) Int. Cl.
*G07C 9/00*     (2020.01)
*H02M 3/156*    (2006.01)
*H02M 3/158*    (2006.01)

(52) U.S. Cl.
CPC ........ *G07C 9/00309* (2013.01); *H02M 3/158* (2013.01); *H02M 3/1563* (2013.01);
(Continued)

(58) Field of Classification Search
CPC ...... G07C 9/00309; G07C 2009/00634; G07C 2009/00769; H02M 3/1563; H02M 3/158; E05B 2047/0062
See application file for complete search history.

(56) References Cited

U.S. PATENT DOCUMENTS 5,663,713 A * 9/1997 Ironside ............... B62D 5/0493
327/143
2006/0261746 A1   11/2006 Huang et al.
(Continued)

FOREIGN PATENT DOCUMENTS

CN     101459381     6/2009
CN     102523650     6/2012
(Continued)

OTHER PUBLICATIONS

Received STIC search report from EIC2800 searcher Steve Chung on Oct. 4, 2021. (Year: 2021).*
(Continued)

*Primary Examiner* — Shawki S Ismail
*Assistant Examiner* — Htet Z Kyaw
(74) *Attorney, Agent, or Firm* — Sheridan Ross P.C.

(57) ABSTRACT

It is presented a power converter for transferring electric power provided on an input terminal to an energy storage element. The power converter comprises: an inductor; a switch connected to selectively control a connection between the inductor and the input terminal; and a comparator, wherein an output of the comparator controls the switch, a first input of the comparator is supplied with a voltage being proportional to a voltage of the input terminal, and a second input of the comparator is supplied with a voltage being proportional to a current from the input terminal; wherein the energy storage element is connected to a point between the inductor and the switch.

13 Claims, 4 Drawing Sheets

(52) U.S. Cl.
CPC .............. *G07C 2009/00634* (2013.01); *G07C 2009/00769* (2013.01)

(56) References Cited

U.S. PATENT DOCUMENTS

| | | | |
|---|---|---|---|
| 2008/0061756 A1* | 3/2008 | Shirai | H03K 17/6871 323/282 |
| 2009/0174479 A1* | 7/2009 | Yan | H03F 3/393 330/252 |
| 2010/0060250 A1* | 3/2010 | Noda | H02M 3/156 323/282 |
| 2011/0316508 A1* | 12/2011 | Cheng | H02M 3/1588 323/282 |
| 2012/0299553 A1* | 11/2012 | Menegoli | H02M 3/1582 320/140 |
| 2014/0117955 A1 | 5/2014 | Zoso et al. | |
| 2014/0292288 A1* | 10/2014 | Yan | H02M 3/156 323/234 |
| 2015/0083196 A1 | 3/2015 | Gray et al. | |
| 2016/0087532 A1 | 3/2016 | Stanzione | |
| 2016/0100368 A1* | 4/2016 | Sharma | H04W 52/0261 455/574 |
| 2017/0085182 A1* | 3/2017 | Colbeck | H02M 3/33507 |

FOREIGN PATENT DOCUMENTS

| | | | |
|---|---|---|---|
| GB | 2221362 | * 1/1990 | H03H 7/255 |
| WO | WO 2016/180970 | 11/2016 | |

OTHER PUBLICATIONS

Attached foreign patent GB2221362A. (Year: 1990).*
Official Action with English Translation for China Patent Application No. 201780078066.4, dated Jul. 2, 2020, 11 pages.
International Search Report and Written Opinion for International (PCT) Patent Application No. PCT/EP2017/083884, dated Mar. 29, 2018, 12 pages.
International Preliminary Report on Patentability for International (PCT) Patent Application No. PCT/EP2017/083884, dated Mar. 12, 2019, 18 pages.

* cited by examiner

POWER CONVERTER FOR TRANSFERRING POWER

CROSS REFERENCE TO RELATED APPLICATIONS

This application is a national stage application under 35 U.S.C. 371 and claims the benefit of PCT Application No. PCT/EP2017/083884 having an international filing date of 20 Dec. 2017, which designated the United States, which PCT application claimed the benefit of European Patent Application No. 16205857.2 filed 21 Dec. 2016, the disclosure of each of which are incorporated herein by reference.

TECHNICAL FIELD

The invention relates to a power converter for transferring power. A corresponding energy harvesting device and electrical lock are also presented.

BACKGROUND

Various types of electronic locking systems are known in the art. Instead of utilising a purely mechanical lock, some locking systems include an electronic drive of a lock member (e.g. a lock bolt) to unlock a barrier to give physical access to the area behind the barrier.

Furthermore, instead of utilizing a traditional key to unlock the door, various types of electronic communication methods for authorizing a person to access the area behind the door are known. Such communication methods can be based on wireless communication, e.g. Radio Frequency Identification (RFID) or Bluetooth Low Energy (BLE). Contact based communication is also possible, where an electronic key is inserted into the lock to enable communication.

In order to power an electronic locking system, so called "self-powered" electronic locking systems have been proposed, where electricity is generated by a mechanical actuation of the user (e.g. of the door handle, key insertion or door opening) and the generated electricity is used to power the electronic locking system. This concept is also known as energy harvesting.

The generated electric power is stored in an energy storage element, e.g. capacitor, to be used by the electronic locking system. One solution known in the art is to simply connect the energy storage element to the generator via a diode. However, such a solution is inefficient, allowing a power transfer from the generator to the energy storage element of only about 50 percent.

US 2006/261746 A1 discloses a power control circuit including a power switch unit operable so as to enable and disable supply of an input voltage from an external power source to an LC circuit, a voltage detecting unit for generating a first voltage signal in accordance with an output voltage applied to a load and outputted by the LC circuit, and a current detecting unit for generating a second voltage signal in accordance with a current flowing through the power switch unit. A driver receives a pulse width modulation signal from a comparator in accordance with a comparison result between a summation of the first and second voltage signals and a reference voltage, and outputs a driving signal to a control input unit of the power switch unit so as to control a duty cycle of the power switch unit, thereby controlling rated power supplied to the load to correspond to the reference voltage. However, the presented solution is focused on providing power in a specific voltage range and with a specific power output. The provided solution does not provide a solution where efficiency of power transfer is optimised.

As the energy budget is often extremely limited, the transfer of electric power to the energy storage elements should be as efficient as possible.

SUMMARY

It is an object to provide a power converter with increased efficiency of energy transfer.

According to a first aspect, it is presented a power converter for transferring electric power provided on an input terminal to an energy storage element. The power converter comprises: an inductor; a switch connected to selectively control a connection between the inductor and the input terminal; and a comparator, wherein an output of the comparator controls the switch, a first input of the comparator is supplied with a voltage being proportional to a voltage of the input terminal, and a second input of the comparator is supplied with a voltage being proportional to a current from the input terminal; wherein the energy storage element is connected to a point between the inductor and the switch.

Aa first resistor may be provided between the input terminal and the switch, in which case the second input of the comparator is connected to a point between the first resistor and the switch.

The second input may be connected to a first point between the inductor and ground, in which case a first resistor is connected between the first point and ground.

The power converter may further comprise a comparator input circuit connected between the input terminal and ground, wherein the comparator input circuit comprises two serially connected resistors and wherein the first input of the comparator is connected to a third point between the two serially connected resistors.

The power converter may further comprise a comparator input circuit connected between the input terminal and ground, wherein the comparator input circuit is implemented using a microprocessor to provide an output voltage to the first input of the comparator.

The microprocessor may be configured to provide an output voltage which is proportional to a voltage of the input terminal, wherein the output voltage is provided to the first input of the comparator.

The first resistor and the comparator input circuit may be dimensioned such that an impedance seen from the input terminal matches a desired impedance. The desired impedance can be selected to match an impedance of a connected power source, which provides efficient power transfer.

The power converter may further comprise a diode provided between the energy storage element and the point between the inductor and the switch.

The power converter may further comprise a capacitor connected between the input terminal and ground.

The comparator may be implemented with hysteresis.

According to a second aspect, it is presented an energy harvesting device comprising the power converter according to the first aspect.

The energy harvesting device may further comprise a generator configured to provide electrical power to the input terminal of the power converter.

According to a third aspect, it is presented an electronic lock comprising a handle, an electronic lock controller, and the energy harvesting device according to the second aspect, the energy harvesting device being mechanically connected to the handle to harvest energy and wherein the energy storage device of the power converter is electrically connected to the electronic lock controller to power the electronic lock controller.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on the realisation that a power converter which exhibits an essentially constant impedance on its input achieves a greatly improved power transfer efficiency. This is achieved by a circuit where a voltage proportional to the input terminal is compared with a voltage which is proportional to a current from the input terminal. The output of the comparison controls the connection or disconnection of the loading circuit to the input terminal.

Figure 1:
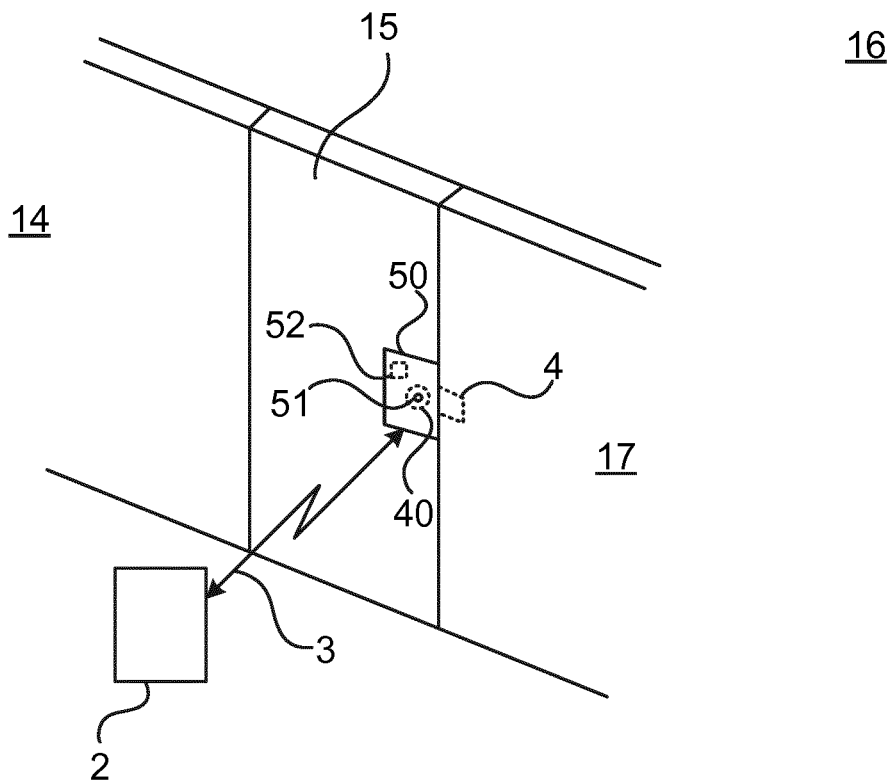
FIG. 1 is a schematic diagram showing an environment in which embodiments presented herein can be applied.

FIG. 1 is a schematic diagram showing an environment in which embodiments presented herein can be applied. Access to a physical space 16 is restricted by a physical barrier 15 which is selectively unlockable. The physical barrier 15 stands between the restricted physical space 16 and an accessible physical space 14. Note that the accessible physical space 14 can be a restricted physical space in itself, but in relation to this physical barrier 15, the accessible physical space 14 is accessible. The barrier 15 can be a door, gate, hatch, cabinet door, drawer, window, etc. In order to control access to the physical space 16, by selectively unlocking the barrier 15, an electronic lock 50 is provided. The electronic lock 50 comprises an electronic lock controller 52 performing the access control and an electronically controllable lock mechanism 4, e.g. comprising a bolt controlled by an electric motor.

The electronic lock 50 can be provided in the barrier 15 itself or in the structure 17 surrounding the barrier 15 (not shown). The electronic lock 50 is controllable to be in a locked state or in an unlocked state.

The electronic lock 50 can communicate with a portable key device 2 over an interface 3 which can be wireless or contact based. The portable key device 2 is any suitable device portable by a user and which can be used for authentication over the wireless interface 3. The portable key device 2 is typically carried or worn by the user and may be implemented as a mobile phone, smartphone, key fob, wearable device, smart phone case, RFID (Radio Frequency Identification) card, etc. Alternatively, the electronic lock 50 communicates with the portable key device 2, e.g. when the portable key device 2 is inserted into the electronic lock 50, over a contact based interface (not shown), e.g. using a serial interface (e.g. RS485, RS232), Universal Serial Bus (USB), Ethernet, or even a simple electric connection. Using the interface 3, the authenticity of the portable key device 2 can be checked in an access control procedure, e.g. using a challenge and response scheme, after which the electronic lock 50 grants or denies access.

When the access control procedure results in granted access, the electronic lock 50 sends an unlock signal to the electronically controllable lock mechanism 4, whereby the electronic lock 50 is set in an unlocked state.

When the electronic lock 50 is in an unlocked state, barrier 15 can be opened using a handle 51, and when the electronic lock 50 is in a locked state, the barrier 15 cannot be opened. In this way, access to a restricted physical space 16 can be controlled by the electronic lock 50.

The electronic lock 50 needs electrical power to operate. In this embodiment, an energy harvesting device 40 is provided to generate electric power for an electronic lock controller 52 of the electronic lock. The energy harvesting device 40 converts mechanical motion to electric power made available for the electronic lock controller 52. The mechanical motion can e.g. be a result of the rotational motion of the handle 51 turning and/or when the barrier 15 is opened and/or closed.

Figure 2:
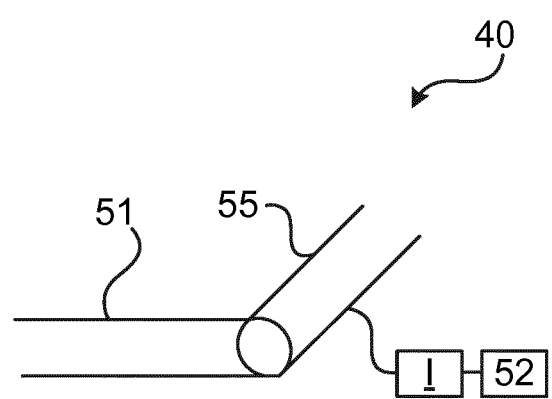
FIG. 2 is a schematic diagram illustrating the energy harvesting device of FIG. 1 in some more detail.

FIG. 2 is a schematic diagram illustrating the energy harvesting device 40 of FIG. 1 in some more detail. The energy harvesting device 40 here comprises a generator 55. The energy harvesting device 40 is mechanically connected to the handle 51 to harvest (mechanical) energy and electrically connected to the electronic lock controller 52 to power the electronic lock controller 52. There can be other mechanical components between the handle 51 and the energy harvesting device 40, e.g. springs, gears, etc. to increase the rotational speed. A power converter 1 is provided between the generator 55 and the electronic lock controller 52 to transfer power from the generator to the lock controller 52 in an efficient way. This may comprise the use of a rectifier (not shown) between the generator and the power converter 1. It is to be noted that the generator can be connected to other mechanical energy sources (not shown) than the handle 51.

Figure 3:
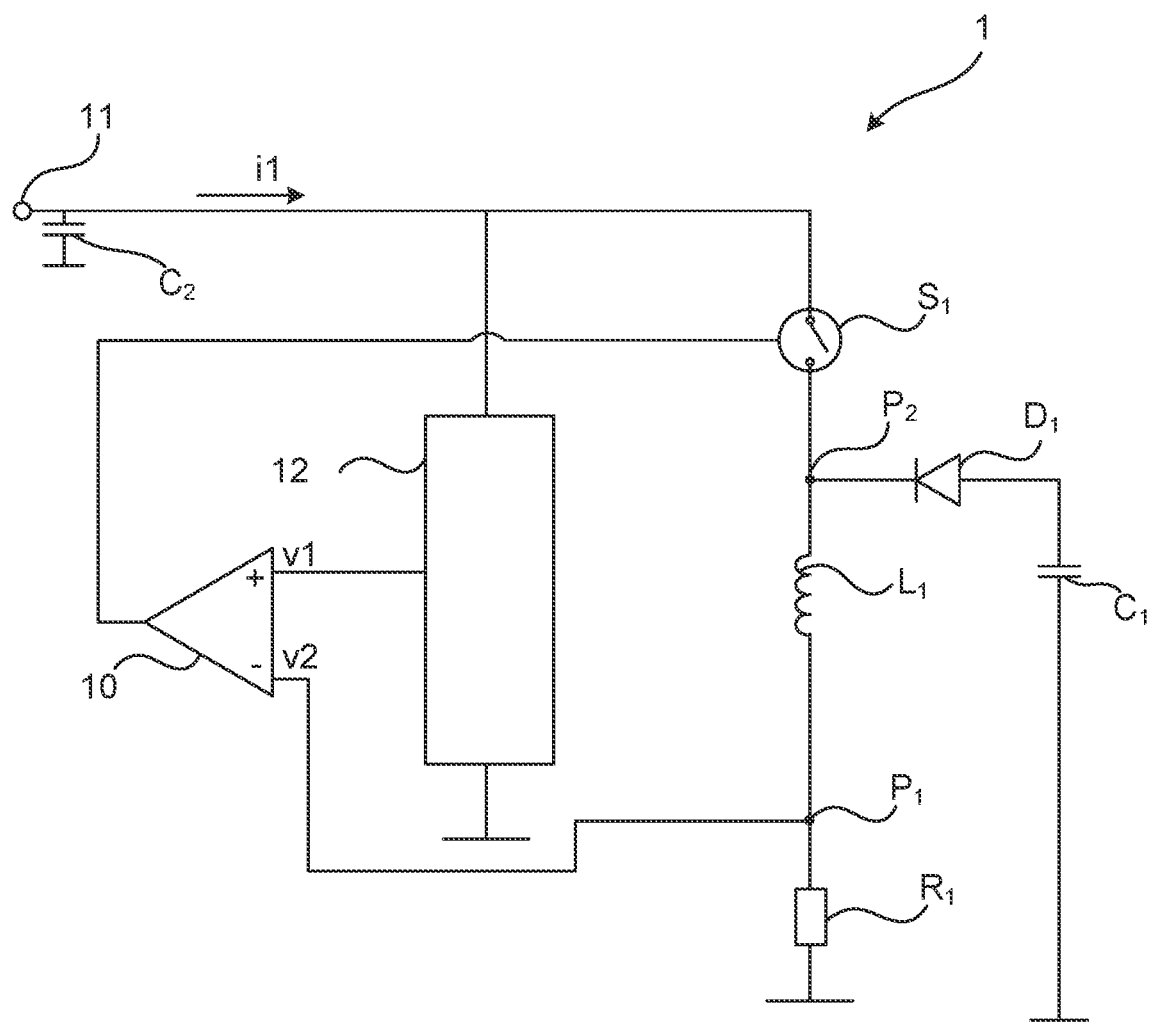
FIG. 3 is a schematic diagram illustrating a power converter according to one embodiment.

FIG. 3 is a schematic diagram illustrating a power converter 1 according to one embodiment. The power converter 1 can e.g. be applied in the energy harvesting device 40 of FIG. 2.

The power converter 1 transfers electric power supplied on an input terminal 11 to an energy storage element C1.

One effect of this particular power converter 1 is also that the voltage is reversed. The electric power supplied to the energy storage element C1 can then be consumed as desired by the application, e.g. for an electronic lock as shown above.

An inductor L1 is provided and a switch S1 is connected to selectively control a connection between the inductor L1 and the input terminal 11. The switch can e.g. be implemented using a transistor, such as a MOSFET (Metal Oxide Semiconductor Field Effect Transistor). A comparator input circuit 12 is connected between the input terminal 11 and ground.

The energy storage element C1 is any suitable element for energy storage. For instance, the energy storage element C1 can be a capacitor. Alternatively, the energy storage element C1 can be a supercapacitor, battery, or even (if a slightly different structure is provided) an inductor.

A comparator 10, is provided such that an output of the comparator 10 controls the switch S1. A first input, e.g. the positive input, of the comparator is connected to the comparator input circuit and a second input, e.g. the negative input, of the comparator is connected to a first point P1 between the inductor L1 and ground. A first resistor R1 can be connected between the first point P1 and ground. Alternatively, a diode can be provided between the first point P1 and ground.

The energy storage element C1 is connected to a second point P2 between the inductor L1 and the switch S1 and the energy storage element. A diode D1 can be provided between the second point P2 and the energy storage element C1. This diode D1 prevents any positive current to flow to the energy storage element C1.

The comparator input circuit 12 is configured to provide an output signal to the comparator which is proportional to the voltage of the input terminal 11.

An input capacitor C2 is optionally provided connected between the input terminal 11 and ground.

Optionally, the comparator 10 is implemented with hysteresis to prevent excessive switching of the switch S1.

In the power converter 1 of FIG. 3, a voltage proportional to the input terminal 11 is compared with a voltage which is proportional to the loading circuit with the inductor. The output of the comparison controls the connection or disconnection of the loading circuit to the input terminal 11. Hence, seen from the input terminal 11, the current and voltage vary proportionally, whereby, seen from the input terminal, the power converter 1 exhibits an impedance which is essentially constant. This has proven to be a property which greatly improves power transfer from the input terminal 11 to the energy storage element C1. The power converter is focused on transferring power efficiently. Hence, the voltage of the power provided to the energy storage element is not important and e.g. does not need to be regulated to a particular voltage level or a particular factor of the input voltage. In this way, a freedom of dimensioning components, such as the first resistor and the comparator input circuit, is achieved to e.g. match a desired impedance. The desired impedance can be an impedance of a power source connected to the input terminal, thereby maximising power transfer to the energy storage element C1.

Figure 4A:
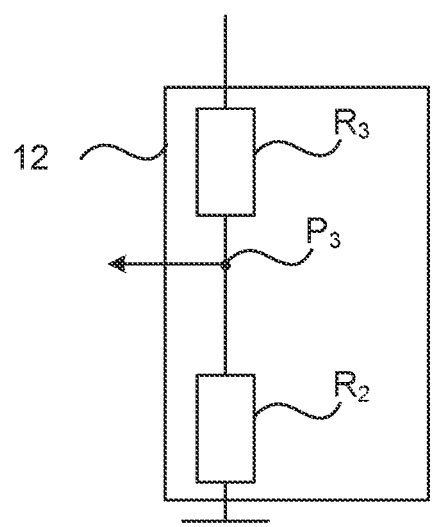
FIGS. 4A-B are schematic diagrams illustrating different embodiments of the comparator input circuit of FIG. 3.
Figure 4B:
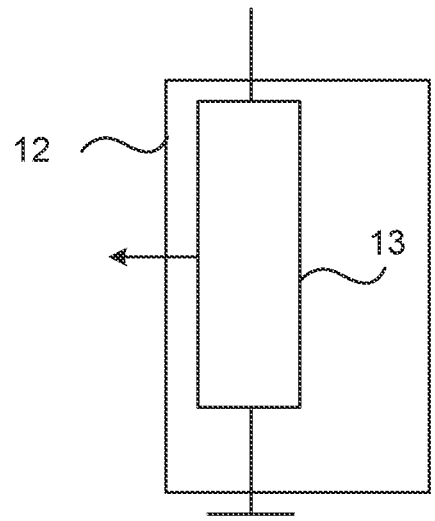

FIGS. 4A-B are schematic diagrams illustrating different embodiments of the comparator input circuit 12 of FIG. 3.

In the embodiment illustrated in FIG. 4A, the comparator input circuit 12 comprises two serially connected resistors R2, R3 and wherein the first input of the comparator 10 is connected to a third point P3 between the two serially connected resistors R2, R3. In other words, the comparator input circuit 12 of FIG. 4A is implemented using a voltage divider.

In the embodiment illustrated in FIG. 4B, the comparator input circuit 12 is implemented using a microprocessor 13, such as an MCU (Microcontroller unit). The microprocessor 13 can then be programed such that the voltage of the output from the comparator input circuit 12 is proportional to the voltage of the input terminal 11.

When the comparator input circuit 12 is implemented using a microprocessor, the comparator 10 is optionally also implemented using the same microprocessor. In such a case, the connection between the comparator input circuit 12 and the comparator 10 is internal to the microprocessor and can even be a communication between software modules.

Figure 5:
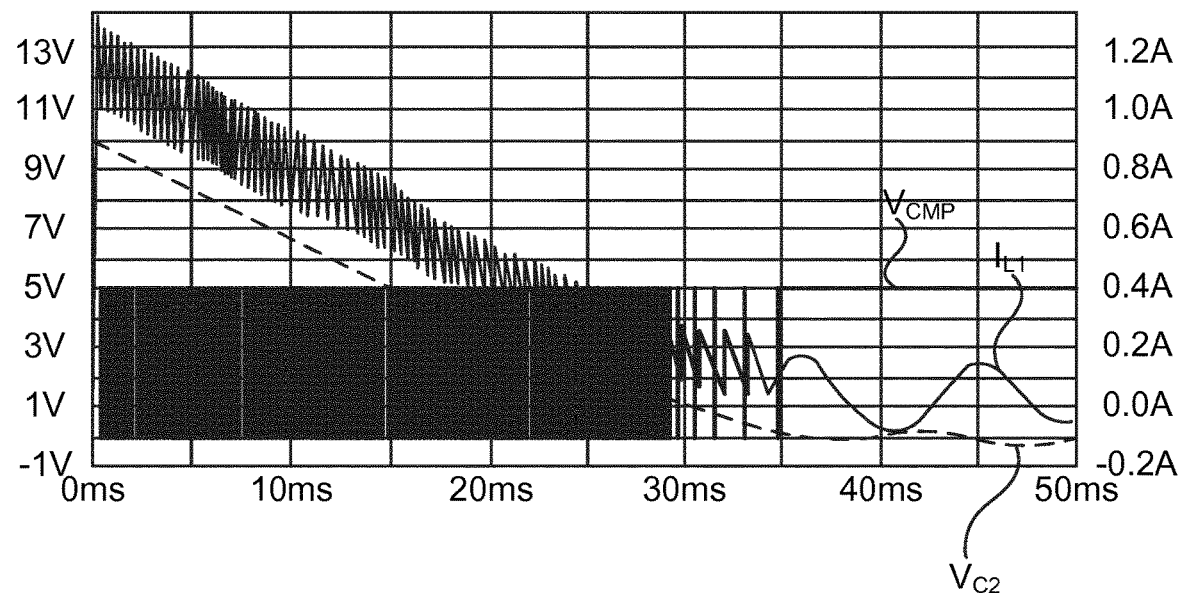
FIG. 5 is a graph illustrating some voltages and currents during transfer of power in the power converter of FIG. 3 according to one embodiment.
Figure 6:
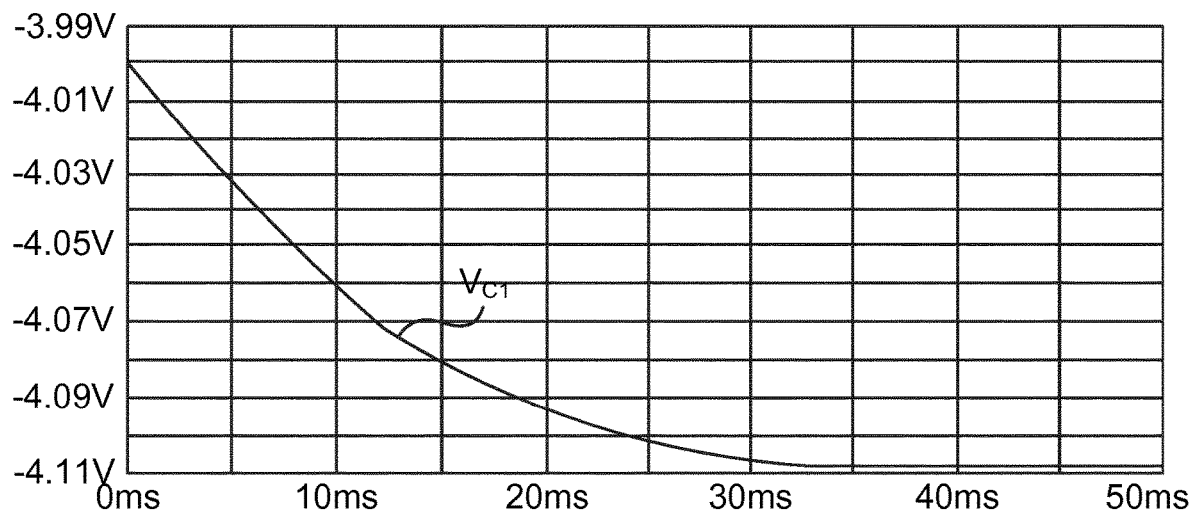
FIG. 6 is a graph illustrating output voltage in the power converter of FIG. 3 according to one embodiment.

The operation of the power converter 1 of FIG. 3 will now be explained in an example, also with reference to FIG. 5 and FIG. 6. FIG. 5 is a graph illustrating the transfer of power in the power converter of FIG. 3 according to one embodiment. FIG. 6 is a graph illustrating output voltage in the power converter of FIG. 4 according to one embodiment. In both FIG. 5 and FIG. 6, time is indicated along the horizontal axis and is measured in ms and both FIG. 5 and FIG. 6 refer to the same power transfer simulation.

In this example, the capacitance of the energy storage element C1 is too mF. The capacitance of the input capacitor C2 is 1 mF. The inductance of the inductor L1 is here 2 mH, which is larger than would typically be used. The reason the inductor L1 is so large in this example is to keep the switching frequency relatively slow to make the example easier to follow in the graphs of FIG. 5 and FIG. 6.

At time 0, the input capacitor C2 has a voltage $V_{C2}$ (See FIG. 5) of to V and the energy storage element C1 has a voltage $V_{C1}$ (See FIG. 6) of −4 V.

At time 0 ms the voltage $V_{P3}$ at the third point P3 is positive (the value of which depends on the sizes of the first resistor R1 and the second resistor R2). At the same time, the voltage $V_{P1}$ at the first point P1 is about zero.

Hence, the comparator to will generate a high output voltage $V_{CMP}$, which causes the switch S1 to close (i.e. is set in a conducting state). P2 will then have the same voltage as the input terminal 11 and current will start to flow through the inductor L1 and the first resistor R1. The diode D1 prevents any current from reaching the energy storage element C1, which would discharge the energy storage element C1 since it has a negative voltage. Instead, a current $I_{L1}$ through the inductor L1 increases linearly. Since the inductor L1 is current stiff, the increase in the current $I_{L1}$ through the inductor L1 is not instant and depends on the inductance of the inductor L1. The current thus increases also through the first resistor R1, which will cause the voltage $V_{P1}$ at the first point P1 to increase. This continues until the voltage $V_{P1}$ at the first point P1 surpasses the voltage $V_{P3}$ at the third point P3, at which point the output voltage $V_{CMP}$ of the comparator in goes low. This causes the switch S1 to open (i.e. is set in a Mocking state).

The inductor L1 is current stiff, whereby the current $I_{L1}$ through the inductor L1 will continue. Since the switch S1 is now open, this results in a negative voltage in point $P_2$ and hence a current will be pulled, via the diode D1, from the energy storage element C1. Since the voltage $V_{C1}$ of the energy storage element C1 is negative, this voltage $V_{C1}$ will become even more negative, thus increasing the energy stored in the energy storage element C1. The current $I_{L1}$ through the inductor L1 decreases over time, thus reducing the voltage $V_{P1}$ at in the first point P1 until, once again, the output voltage $V_{CMP}$ of the comparator in goes high, causing the switch S1 to close again, repeating the process described.

In other words, energy from the input terminal 11 is temporarily stored as a current through the inductor L1, which is switched and transferred to the energy storage element C1. In this way, the power converter can be used for a great range of voltages on the input terminal 11 and still provide an efficient energy transfer to the energy storage element C1.

The comparator 10 is provided with hysteresis to prevent instant switching back and forth.

As seen in FIG. 5, the average of the current $I_{L1}$ through the inductor decreases in linear proportion with the decreasing voltage $V_{C2}$ of the input capacitor. Hence, from the input terminal perspective 11, the power converter exhibits an essentially constant impedance. This is of significance, since an essentially constant impedance improves the efficiency of energy transfer using a generator connected to the converter.

At about 35 ms, there is not sufficient voltage $V_{C2}$ of the input capacitor to keep the process going. The switch at this stage stays in an open state, which results in the current $I_{L1}$ to look the way it does.

A calculation of efficiency in this simulation will now be presented. The calculations are based on the energy of a capacitor being calculated according to $E=(C*V^2)/2$. The numerical values are rounded off where appropriate.

Looking first at the energy at start (i.e. at 0 ms), the input capacitor C2 has the energy $E_{C2}$ of $(C2*V_{C2}^2)/2= (0.001*10^2)/2=50$ mJ. The energy storage element C1 has the energy $E_{C1}$ of $(C1*V_{C1}^2)/2=(0.1*4^2)/2=800$ mJ.

Looking now at the end energy at about 35 ms, the input capacitor C2 has the end energy $E_{C2}'$ of $(C2*V_{C2}^2)/2= (0.001*0.2^2)/2=0.020$ mJ. The energy storage element C1 has the end energy $E_{C1}'$ of $(C1*V_{C1}^2)/2=(0.1*4.11^2)/2=845$ mJ.

Hence, the input capacitor C2 has been drained of (50-0.020) mJ=49.98 mJ. At the same time, the energy storage element C1 has been charged with (845-800) mJ=45 mJ. The efficiency of the power converter 1 in this example is thus calculated by 45/49.98=90%. This efficiency is a tremendous gain from the efficiency of energy converters of the prior art.

While the example above is explained using an amount of energy charged to the input capacitor C2, the same principles are applicable for when a generator supplies input power on the input terminal 11. The generator will on average be loaded by a constant impedance and the process works analogously to what is described above.

Embodiments of the power converter presented herein provide an essentially constant impedance and high efficiency. Moreover, the power converter is applicable for a wide range of input voltages, resulting in an efficient energy transfer to the energy storage element. The power converter is not dependent on a particular switching frequency.

Figure 7:
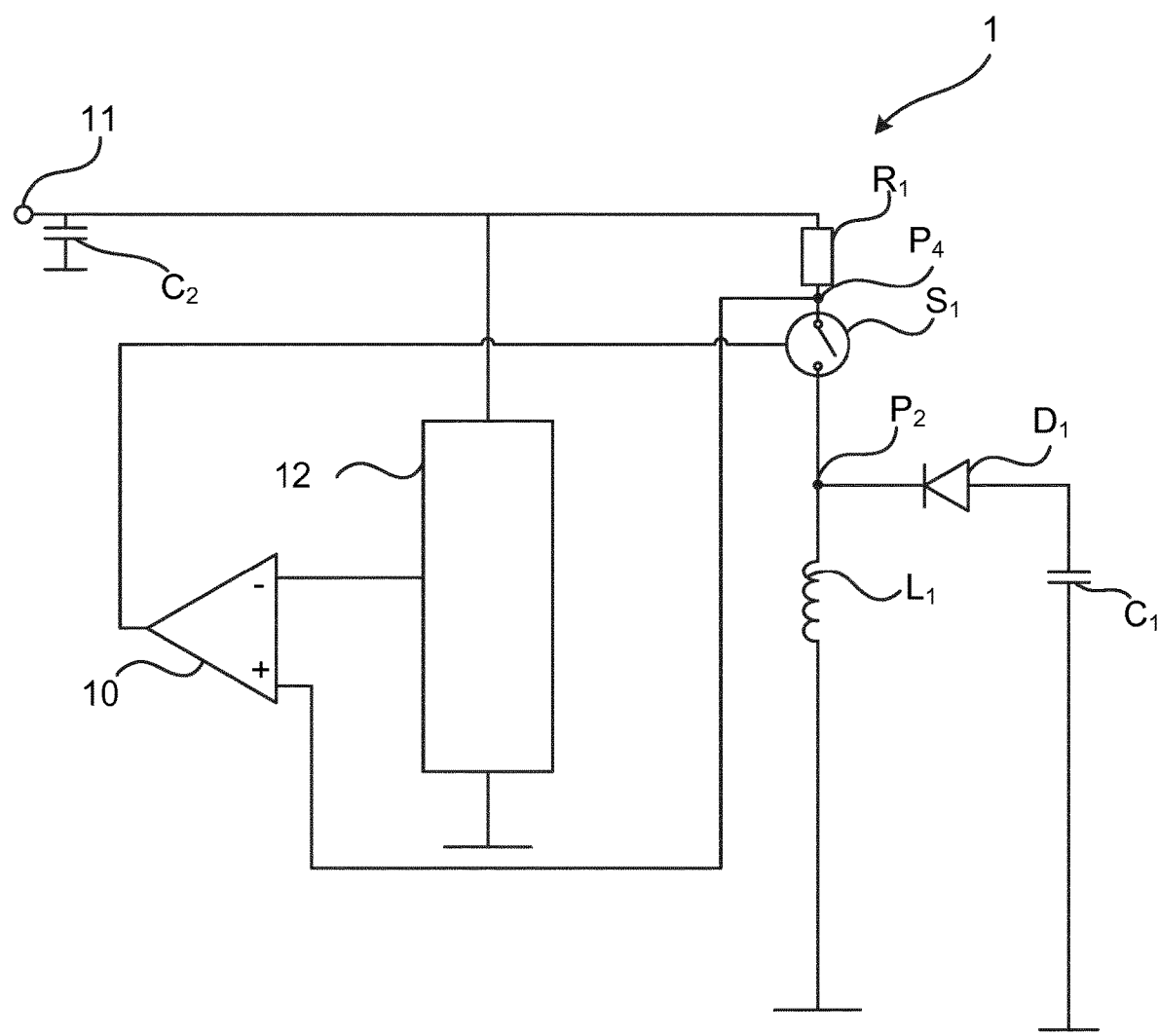
FIG. 7 is a schematic diagram illustrating a power converter according to one embodiment.

FIG. 7 is a schematic diagram illustrating a power converter 1 according to one embodiment. The power converter 1 of this embodiment is similar to the power converter illustrated in FIG. 3 and explained above, so only differences to that power converter are mentioned here.

In this embodiment, the first resistor is provided between the input terminal 11 and the switch S1. The second input of the comparator 10 is here connected to a point P4 between the first resistor R1 and the switch S1. The first input of the comparator is still connected to a point where the voltage is proportional to the voltage on the input terminal.

Compared to the embodiment of FIG. 3, the polarity of the inputs of the comparator in has been inverted.

In this embodiment, the second input is connected to point P4, where the voltage is proportional to the current from the input terminal 11, regardless of the state of the first switch. This results in the input terminal 11 experiencing a more constant impedance, regardless of the state of the switch.

Moreover, since there is no resistor in series with the inductor L1 during the loading of energy to the energy storage element C1, efficiency of power transfer is improved.

In one embodiment, the first resistor and the comparator input circuit 12 can be dimensioned to match the impedance of the power source, to thereby maximise power transfer to the power converter and thus to the energy storage element C1.

It is to be noted that while the power converter of embodiments herein is presented in the context of electronic locks, the power converter can be applied in any suitable context.

Here now follows a list of embodiments from another perspective, enumerated with roman numerals.

i. A power converter for transferring electric power provided on an input terminal to an energy storage element, the power converter comprising:
an inductor;
a switch connected to selectively control a connection between the inductor and the input terminal;
a comparator input circuit connected between the input terminal and ground; and
a comparator, wherein an output of the comparator controls the switch, a first input of the comparator is connected to the comparator input circuit and a second input of the comparator is connected to a first point between the inductor and ground;
wherein the energy storage element is connected to a second point between the inductor and the switch and the energy storage element.

ii. The power converter according to embodiment i, wherein a first resistor is connected between the first point and ground.

iii. The power converter according to embodiment i or ii, wherein the comparator input circuit comprises two serially connected resistors and wherein the first input of the comparator is connected to a third point between the two serially connected resistors.

iv. The power converter according to embodiment i or ii, wherein the comparator input circuit is implemented using a microprocessor.

v. The power converter according to embodiment iv, wherein the microprocessor is configured to provide an output voltage which is proportional to a voltage of the input terminal, wherein the output voltage is provided to the first input of the comparator.

vi. The power converter according to any one of the preceding embodiments, further comprising a diode provided between the second point and the energy storage element.

vii. The power converter according to any one of the preceding embodiments, wherein the energy storage element is a capacitor.

viii. The power converter according to any one of the preceding embodiments, further comprising a capacitor connected between the input terminal and ground.

ix. The power converter according to any one of the preceding embodiments, wherein the comparator is implemented with hysteresis.

x. An energy harvesting device comprising the power converter according to any one of the preceding embodiments.

xi. The energy harvesting device according to embodiment x, further comprising a generator configured to provide electrical power to the input terminal of the power converter.

xii. An electronic lock comprising a handle, an electronic lock controller, and the energy harvesting device according to embodiment x or xi, the energy harvesting device being mechanically connected to the handle to harvest energy and wherein the energy storage device of the power converter is electrically connected to the electronic lock controller to power the electronic lock controller.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A power converter for transferring electric power provided on an input terminal to an energy storage element, the power converter comprising:
    an inductor;
    a diode;
    a switch connected to selectively control a connection between the inductor and the input terminal; and
    a comparator, wherein an output of the comparator controls the switch, a first input of the comparator is supplied with a voltage being proportional to a voltage of the input terminal, and a second input of the comparator is supplied with a voltage being proportional to a current from the input terminal when the switch is closed, whereby the current from the input terminal and the voltage of the input terminal vary proportionally;
    wherein the energy storage element is connected on one end, via the diode, to a point between the inductor and the switch and the energy storage element is connected on the other end to ground, such that an anode side of the diode is connected to the energy storage element and a cathode side of the diode is connected to the point between the inductor and the switch.

2. The power converter according to claim 1, wherein a first resistor is provided between the input terminal and the switch, and wherein the second input of the comparator is connected to a point between the first resistor and the switch.

3. The power converter according to claim 1, wherein the second input is connected to a first point between the inductor and ground, and wherein a first resistor is connected between the first point and ground.

4. The power converter according to claim 1, further comprising a comparator input circuit connected between the input terminal and ground, wherein the comparator input circuit comprises two serially connected resistors and wherein the first input of the comparator is connected to a third point between the two serially connected resistors.

5. The power converter according to claim 4, wherein a first resistor and the comparator input circuit are dimensioned such that an impedance seen from the input terminal matches a desired impedance for improving power transfer.

6. The power converter according to claim 1, further comprising a comparator input circuit connected between the input terminal and ground, wherein the comparator input circuit is implemented using a microprocessor to provide an output voltage to the first input of the comparator.

7. The power converter according to claim 6, wherein the microprocessor is configured to provide an output voltage which is proportional to a voltage of the input terminal, wherein the output voltage is provided to the first input of the comparator.

8. The power converter according to claim 1, wherein the energy storage element is a capacitor.

9. The power converter according to claim 1, further comprising a capacitor connected between the input terminal and ground.

10. The power converter according to claim 1, wherein the comparator is implemented with hysteresis.

11. An energy harvesting device comprising the power converter according to claim 1.

12. The energy harvesting device according to claim 11, further comprising a generator configured to provide electrical power to the input terminal of the power converter.

13. An electronic lock comprising a handle, an electronic lock controller, and the energy harvesting device according to claim 11, the energy harvesting device being mechanically connected to the handle to harvest energy and wherein the energy storage device of the power converter is electrically connected to the electronic lock controller to power the electronic lock controller.

* * * * *